(12) United States Patent
Dalal et al.

(10) Patent No.: US 7,516,286 B1
(45) Date of Patent: Apr. 7, 2009

(54) CONVERSION BETWEEN FULL-DATA AND SPACE-SAVING SNAPSHOTS

(75) Inventors: Chirag Deepak Dalal, Maharashtra (IN); Niranjan S. Pendharkar, Maharashtra (IN)

(73) Assignee: Symantec Operating Corporation, Cupertino, CA (US)

( * ) Notice: Subject to any disclaimer, the term of this patent is extended or adjusted under 35 U.S.C. 154(b) by 309 days.

(21) Appl. No.: 11/216,810

(22) Filed: Aug. 31, 2005

(51) Int. Cl.
*G06F 12/00* (2006.01)

(52) U.S. Cl. .......................... 711/162; 707/204; 714/6

(58) Field of Classification Search ................. 711/162
See application file for complete search history.

(56) References Cited

U.S. PATENT DOCUMENTS

| | | | |
|---|---|---|---|
| 6,651,075 B1 * | 11/2003 | Kusters et al. | 707/204 |
| 6,785,786 B1 * | 8/2004 | Gold et al. | 711/162 |
| 7,111,014 B2 * | 9/2006 | Sawdon et al. | 707/102 |
| 7,231,544 B2 * | 6/2007 | Tan et al. | 714/15 |

* cited by examiner

*Primary Examiner*—Kevin L Ellis
*Assistant Examiner*—Matthew Bradley
(74) *Attorney, Agent, or Firm*—Campbell Stephenson LLP (57) ABSTRACT

A method, system, computer system, and computer-readable medium that enable a copy of data to be converted from a full-data snapshot to a space-saving snapshot, or vice versa, while retaining all the contents of the snapshot. Full-data snapshots can be used for efficient read operations and off-host processing operations. Space-saving snapshots can be used to store multiple copies of primary data in a minimum amount of storage space without consuming unnecessary storage space to store duplicate copies of data that are not changing. The ability to convert between full-data and space-saving snapshots enables organizational storage, backup, and recovery needs to be met using the best type of snapshot for a given operation.

23 Claims, 9 Drawing Sheets

**Conversion between Full-Data Snapshots
and Space-Saving Snapshots**

Fig. 1A
Comparison of Full-Data Snapshots and Space-Saving Snapshots

Fig. 1B
Conversion between Full-Data Snapshots and Space-Saving Snapshots

Fig. 2
Reading a Space-Saving Snapshot

Fig. 3
Conversion of Space-Saving Snapshot to Full-Data Snapshot

Fig. 5A
Bitmaps used in
Tracking Write Operations

Fig. 5B
Building a
Snapshot Validity Read Map

Fig. 5C
Conversion from
Full-Data Snapshot to
Space-Saving Snapshot

| | Parent | | Snapshot | | Action |
|---|---|---|---|---|---|
| | Valid | Modified | Valid | Modified | |
| 1 | 0 | 0 | 0 | 0 | |
| 2 | 0 | 0 | 0 | 1 | |
| 3 | 0 | 0 | 1 | 0 | Preserve Value in Snapshot |
| 4 | 0 | 0 | 1 | 1 | Preserve Value in Snapshot |
| 5 | 0 | 1 | 0 | 0 | |
| 6 | 0 | 1 | 0 | 1 | |
| 7 | 0 | 1 | 1 | 0 | Preserve Value in Snapshot |
| 8 | 0 | 1 | 1 | 1 | Preserve Value in Snapshot |
| 9 | 1 | 0 | 0 | 0 | |
| 10 | 1 | 0 | 0 | 1 | |
| 11 | 1 | 0 | 1 | 0 | No Action (Same in Both) |
| 12 | 1 | 0 | 1 | 1 | Preserve Value in Snapshot |
| 13 | 1 | 1 | 0 | 0 | |
| 14 | 1 | 1 | 0 | 1 | |
| 15 | 1 | 1 | 1 | 0 | Preserve Value in Snapshot |
| 16 | 1 | 1 | 1 | 1 | Preserve Value in Snapshot |

*Fig. 6*
*Conversion Indicators*

CONVERSION BETWEEN FULL-DATA AND SPACE-SAVING SNAPSHOTS

BACKGROUND OF THE INVENTION

Copies of production data of an organization are often maintained for backup and recovery purposes. One or more complete copies of the production data, also referred to herein as primary data, may be maintained, thereby requiring the amount of storage space occupied by the primary data to be multiplied by the number of copies of the data. These full copies of the data, referred to as "full-data snapshots," are usually created for off-host processing. For example, when a company installs a new accounting system, there typically is a period of time during which the old and new accounting systems are run in parallel. This testing period allows the new system to be tested with a copy of live data without risking corruption of the live production data. However, allocation of storage space for a complete copy of the data, such as are available in a full-data snapshot, may limit the number of full-data snapshots that can be maintained by an organization.

Another type of copy of primary data is a space-saving snapshot. In a space-saving snapshot, changes to the primary data are tracked and respective regions are marked as having been changed. For example, a change to data for a given region may be marked in a bitmap, where each bit represents a region of primary data. When a change to the primary data is about to be made via a write operation, a copy of the primary data before the change is captured in a copy-on-write operation. These space-saving snapshots consume much less storage space, as space is necessary only to track copies of regions for which the primary data have changed.

However, to obtain a complete copy of the primary data as captured in a space-saving snapshot, data must be read from two locations, the parent copy of the data and the space-saving snapshot. Reading from multiple locations is much less efficient than reading from a complete copy of the data. Furthermore, "off-host processing" (processing performed by a computer that is not the host of the applications maintaining the primary data) typically cannot operate on data stored in a space-saving snapshot. Space-saving snapshots are useful in maintaining many point-in-time copies of primary data without consuming unnecessary storage space to store duplicate copies of data that are not changing.

What is needed is a way to quickly convert from a copy of data in a full-data snapshot to a space-saving snapshot, or vice versa, while retaining all of the contents of the snapshot.

SUMMARY OF THE INVENTION

The present invention enables a copy of data to be converted from a full-data snapshot to a space-saving snapshot, or vice versa, while retaining all the contents of the data. Full-data snapshots can be used for efficient read operations and off-host processing operations. Space-saving snapshots can be used to store multiple copies of primary data in a minimum amount of storage space without consuming unnecessary storage space to store duplicate copies of data that are not changing. The ability to convert between full-data and space-saving snapshots enables organizational storage, backup, and recovery needs to be met using the best type of snapshot for a given operation.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention enables a copy of data to be converted from a full-data snapshot format to a space-saving format, or vice versa, while retaining all the contents of the snapshot. Full-data snapshots can be used for efficient read operations and off-host processing operations. Space-saving snapshots can be used to store multiple copies of primary data in a minimum amount of storage space without consuming unnecessary storage space to store duplicate copies of data that are not changing. The ability to convert between full-data and space-saving snapshots enables organizational storage, backup, and recovery needs to be met using the best type of snapshot for a given operation.

Figure 1A:
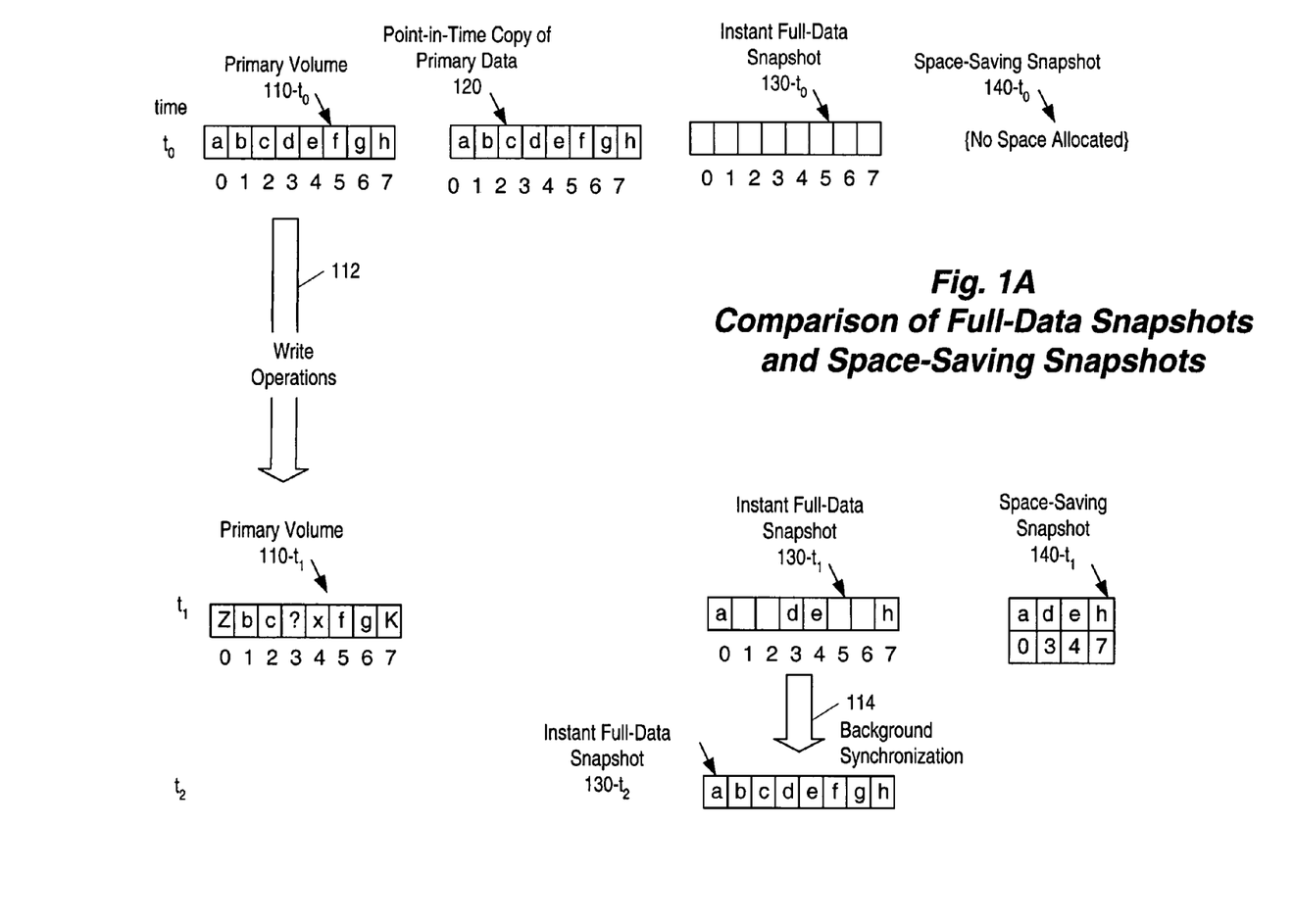
FIG. 1A shows a primary volume and its contents at different points in time, along with snapshots of the contents of the primary volume at those points in time.

FIG. 1A shows a primary volume and its contents at different points in time, along with snapshots of the contents of the primary volume at those points in time. The primary volume is shown at times $t_0$ and $t_1$, respectively labeled as primary volumes 110-$t_0$ and 110-$t_1$. The primary volume includes data in eight regions, shown here as regions 0 through 7.

Point-in-time Copy of Primary Data 120 is a point-in-time copy of the data in primary volume 110 at time $t_0$. A point-in-time copy of the primary data contains the complete data of the primary volume, here primary volume 110, at a given point in time. A point-in-time copy may be created, for example, by "breaking" a mirror away from the primary volume 110. Other techniques for creating a point-in-time copy of data in primary volume 110 are also possible, and the scope of the present invention is not limited to any such point-in-time copy creation technique. After a point-in-time copy is made, the point-in-time data does not change. A point-in-time copy is assumed to require the same amount of storage space as the primary volume did at the time the point-in-time copy was made.

Two forms of "instant" snapshots are shown in FIG. 1, an instant full-data snapshot 130-$t_0$ and an instant space-saving snapshot 140-$t_0$. Creation of instant snapshots is described in U.S. Pat. No. 6,785,789, entitled "Method and Apparatus of Making a Virtual Data Copy," which issued on Aug. 31, 2004. This patent is incorporated herein in its entirety and for all purposes.

The term "instant snapshot" is used herein to refer to a snapshot that is instantly available once it is created; no time is required to synchronize contents of the snapshot with the primary volume before the snapshot and/or the primary volume can be used. Instant full-data snapshot 130-$t_0$ is allocated at time to contain eight regions, shown here as regions 0 through 7. Instant full-data snapshot 130-$t_0$ serves as the recipient of the original values of primary data when the primary data are updated. Prior to each write operation on primary volume 110, a copy-on-write operation is performed to capture the original values of the data before the data are overwritten. Once an instant full-data snapshot is created, a background process optionally begins to synchronize the data in the instant full-data snapshot with the primary volume. Because every region of primary volume 110 is ultimately copied to a corresponding region of the instant full-data snapshot, instant full-data snapshot 130-$t_0$ is allocated to include space sufficient to store data for all eight regions of primary volume 110.

Space-saving snapshot 140-$t_0$ indicates that no space is allocated for a space-saving snapshot at time $t_0$. Instead, space is allocated on an as-needed basis when data in primary volume 110 are overwritten. While space-saving snapshots such as space-saving snapshot 140-$t_1$ are very efficient in terms of storage requirements, space-saving snapshots require more processing resources to read than do full-data snapshots. Reading a space-saving snapshot is further described below with reference to FIG. 2.

In FIG. 1A, between times $t_0$ and $t_1$, write operations occur, as shown by arrow 112. Primary volume 110-$t_1$ shows that data have changed in regions 0, 3, 4, and 7 between times $t_0$ and $t_1$. The original data values are reflected in instant full-data snapshot 130-$t_1$ and in space-saving snapshot 140-$t_1$. Regions 1, 2, 5, and 6 have not been overwritten by a copy-on-write operation. Therefore, the original data for regions 1, 2, 5, and 6 are not reflected yet in instant full-data snapshot 130-$t_1$ and are not represented in space-saving snapshot 140-$t_1$. Space-saving snapshot 140-$t_1$ contains only the original data for regions that have changed since time $t_0$.

In FIG. 1A, a background synchronization process (represented by arrow 114) copies the unchanged regions 1, 2, 5, and 6 from the primary volume 110-$t_0$ the instant full-data snapshot, as shown by instant full-data snapshot 130-$t_2$ at time $t_2$. Once the background synchronization process is complete, data can be read from the instant full-data snapshot.

Figure 1B:
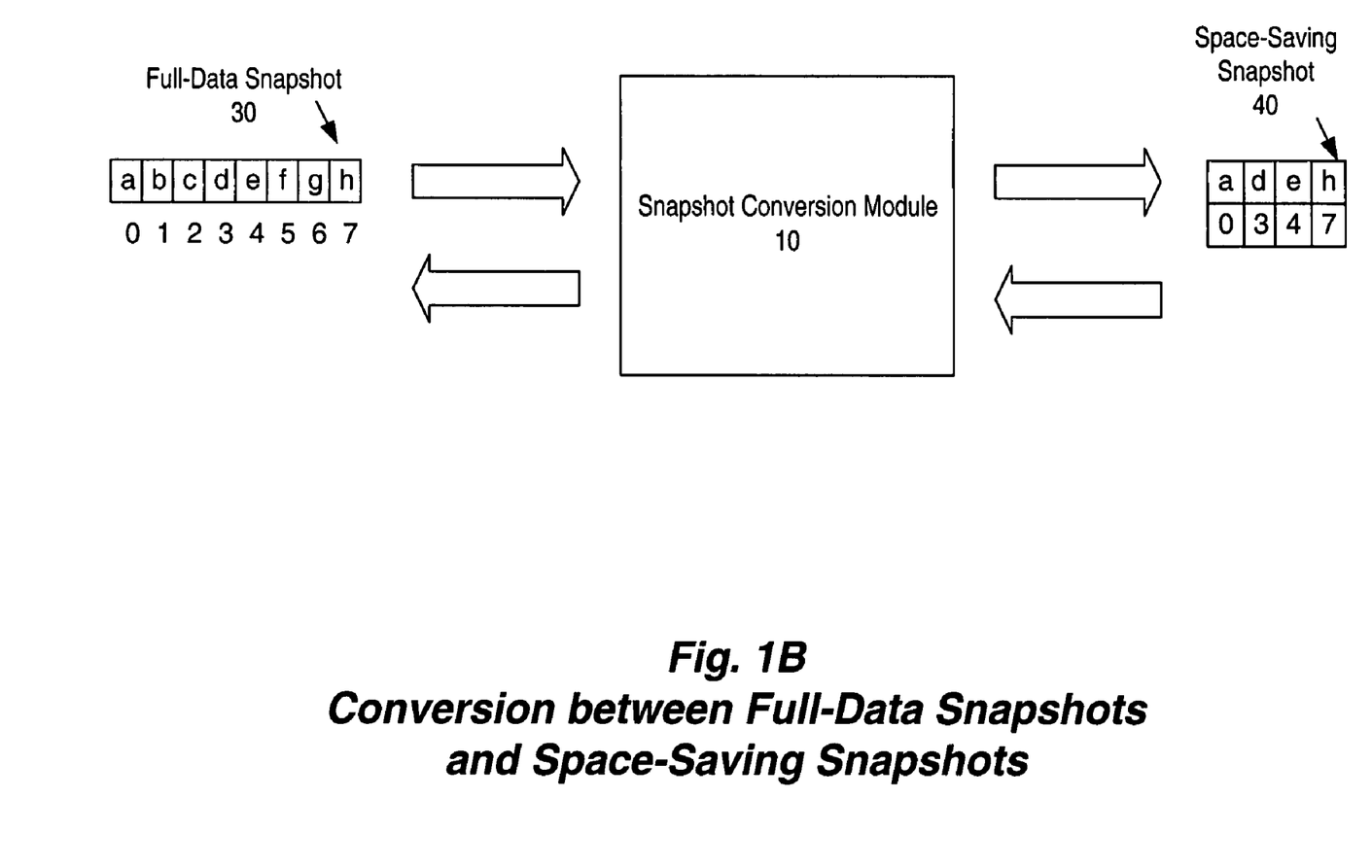
FIG. 1B shows the role of a snapshot conversion module in accordance with one embodiment of the present invention.

FIG. 1B shows the role of a snapshot conversion module 10 in accordance with one embodiment of the present invention. Snapshot conversion module 10 can take as input full-data snapshot 30 and produce space-saving snapshot 40. Snapshot conversion module 10 can also take as input space-saving snapshot 40 and produce full-data snapshot 30. Reading either snapshot should produce the same results. A snapshot conversion module, such as snapshot conversion module 10, may be incorporated into a storage management application. Alternatively, a snapshot conversion module may be sold as a stand-alone product.

Figure 2:
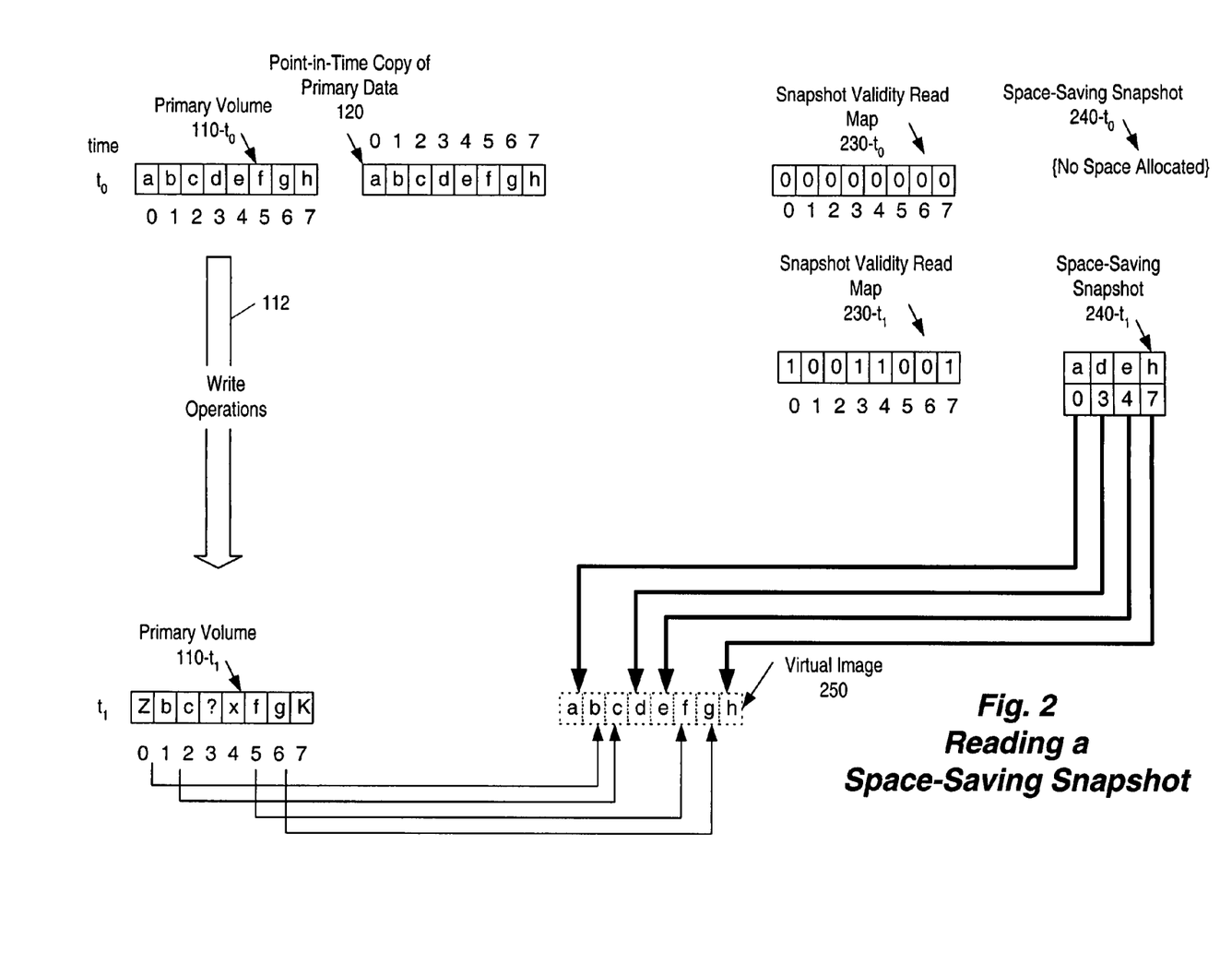
FIG. 2 is a diagram showing a read operation for a space-saving snapshot.

FIG. 2 is a diagram showing a read operation for a space-saving snapshot. Assume that a space-saving snapshot of primary data 110 is to be made at time to, shown here as primary volume 110-$t_0$. To show the space savings achieved by the space-saving snapshot and for comparison purposes, a point-in-time copy of primary data 120 is shown. At time to, the snapshot validity read map 230-$t_0$ and space-saving snapshot 240-$t_0$ are created. In this example, at time to, snapshot validity read map 230-$t_0$ is shown as being initialized with all zeroes. Also at time to, space-saving snapshot 240-$t_0$ is shown as being initialized as empty; e.g, no space is allocated for space-saving snapshot 240-$t_0$.

At time $t_1$, regions to be read from space-saving snapshot 240-$t_1$ have been marked in snapshot validity read map 230-$t_1$. Data for other regions are read from the current primary volume 110-$t_1$, which is also referred to as a 'parent' of the space-saving snapshot. Even though write operations occur to the primary volume, as shown by arrow 112, unchanged data can be read from the current primary volume 110-$t_1$.

The original data values for the changed regions (e.g., those in snapshot validity read map 230-$t_1$ with values of '1') are read from space-saving snapshot 240-$t_1$, and unchanged regions (e.g., those in snapshot validity read map 230-$t_1$ with values of '0') are read from the parent volume, here primary volume 110-$t_1$. This read operation produces virtual image 250, which contains the same data as both primary volume 110-$t_0$ and point-in-time copy of primary data 120. In comparison, the contents of the "space-saving snapshot" 240-$t_1$ are the same, but require only half as much storage space. This storage savings is produced because a full-data snapshot, such as point-in-time copy of primary data 120, contains data for all eight regions, whereas space-saving snapshot 240-$t_1$ only contains data for the four regions that were changed. Because data are read from two locations (the space-saving snapshot and its parent), this read operation is less efficient than reading a full-data snapshot.

Figure 3:
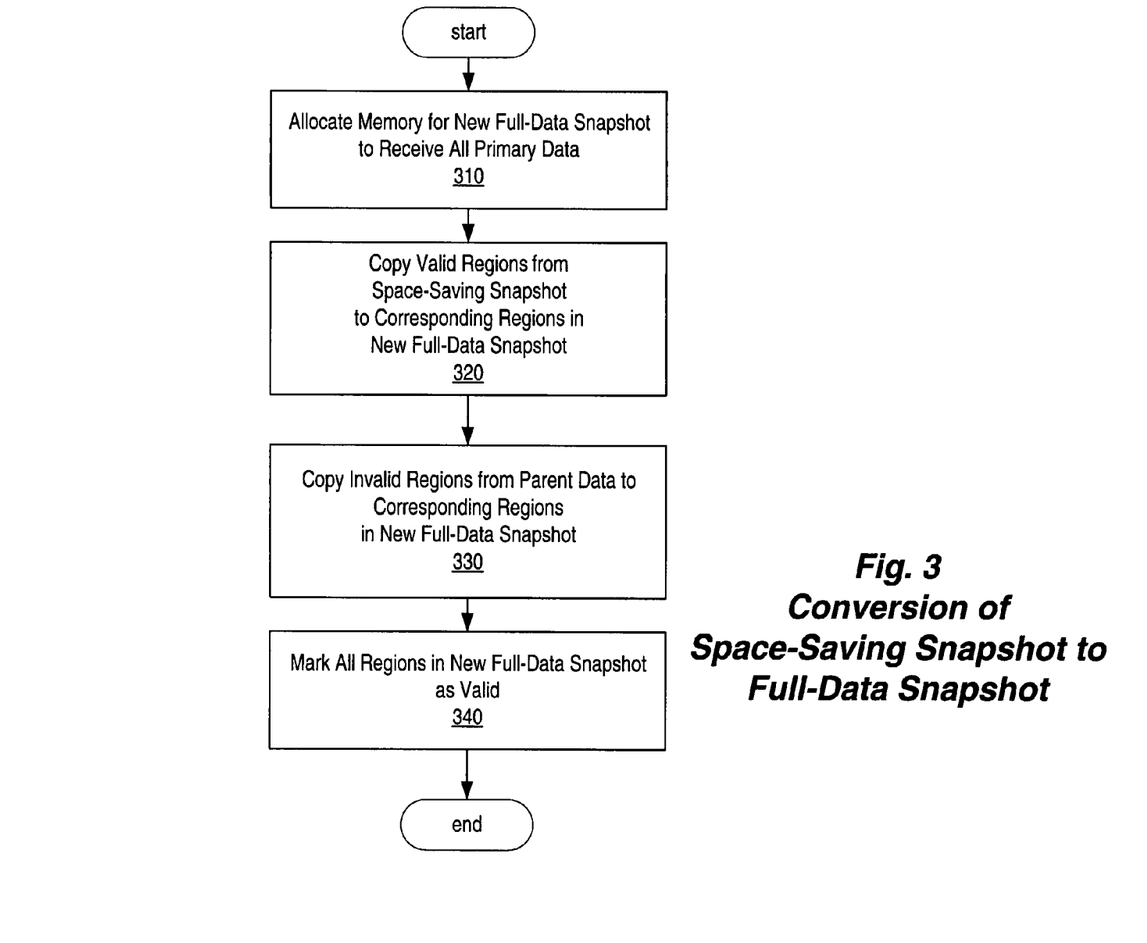
FIG. 3 shows one embodiment of a method for converting from a space-saving snapshot to a full-data snapshot.

FIG. 3 shows one embodiment of a method for converting from a space-saving snapshot to a full-data snapshot. Such a conversion might be performed for off-host processing or because read operations on the space-saving snapshots are too slow. Converting from a space-saving snapshot to a full-data snapshot can be performed by converting instructions, module(s), and/or means. Conversion technology may be included in a storage management application or offered as a stand-alone set of instructions, means, and/or modules. Such instructions, means, and/or modules can be implemented in hardware, firmware, or software.

In "Allocate Memory for New Full-Data Snapshot to Receive All Primary Data" step 310, memory that is sufficient to hold a complete copy of the primary data is allocated. Control proceeds to "Copy Valid Regions from Space-Saving Snapshot to Corresponding Regions in New Full-Data Snapshot" step 320. Valid regions can be determined from a snapshot validity read map, such as snapshot validity read map 230-$t_1$ of FIG. 2. Other ways to determine the valid regions in a space-saving snapshot can also be used within the scope of the invention. Copying the valid regions can be performed by copying instructions, module(s), and/or means.

From "Copy Valid Regions from Space-Saving Snapshot to Corresponding Regions in New Full-Data Snapshot" step 320, control proceeds to "Copy Invalid Regions from Parent Data to Corresponding Regions in New Full-Data Snapshot" step 330. Regions that are not valid in the space-saving snapshot are invalid, and data for those regions are read from the parent of the space-saving snapshot. Copying the invalid regions can be performed by parent-copying instructions, module(s), and/or means.

From "Copy Invalid Regions from Parent Data to Corresponding Regions in New Full-Data Snapshot" step 330, control proceeds to "Mark All Regions in New Full-Data Snapshot as Valid" step 340. All regions in the new full-data snapshot are considered to be valid. This marking can be performed by marking instructions, means, and/or module(s).

Figure 4:
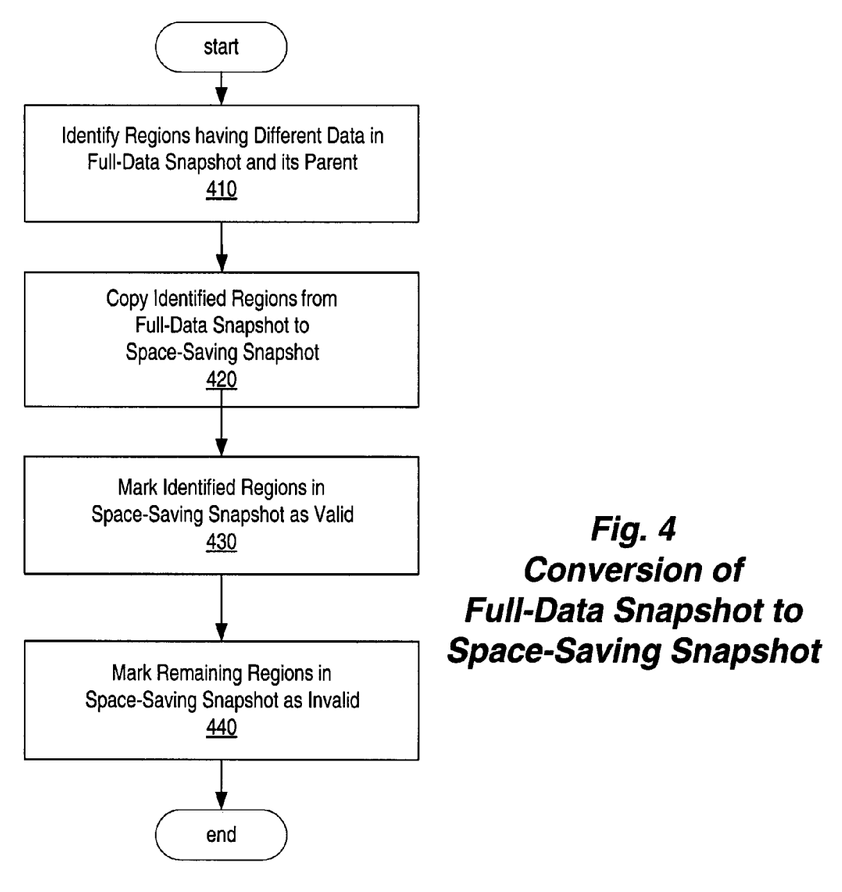
FIG. 4 shows one embodiment of a method for converting from a full-data snapshot to a space-saving snapshot.

FIG. 4 shows one embodiment of a method for converting from a full-data snapshot to a space-saving snapshot. Such a conversion might be performed to save space so that a greater number of snapshots can be retained. Converting from a full-data snapshot to a space-saving snapshot can be performed by converting instructions, module(s), and/or means. Conversion technology may be included in a storage management application or offered as a stand-alone set of instructions, means, and/or modules. Such instructions, means, and/or modules can be implemented in hardware, firmware, or software.

In "Identify Regions having Different Data in Full-Data Snapshot and its Parent" step 410, regions with different data in the snapshot and its parent are identified so that they can be preserved in the space-saving snapshot. (Regions that have data that are the same are read from the parent.) In one embodiment, these regions are identified using bitmaps that track differences between primary data and copies of the primary data. These bitmaps are described in further detail with reference to FIGS. 5A, 5B, 5C, and 6 below. Other ways to identify the regions having different data in a full-data snapshot and its parent can also be used within the scope of the invention. Identifying the regions can be performed by identifying module(s), means, and/or instructions.

From "Identify Regions having Different Data in Full-Data Snapshot and its Parent" step 410, control proceeds to "Copy Identified Regions from Full-Data Snapshot to Space-Saving Snapshot" step 420. The identified regions are preserved in the space-saving snapshot. This copying can be performed by copying module(s), means, and/or instructions, Control then proceeds to "Mark Identified Regions in Space-Saving Snapshot as Valid" step 430. The identified regions are marked as valid in the space-saving snapshot. This marking can be performed by marking module(s), means, and/or instructions. Control proceeds to "Mark Remaining Regions in Space-Saving Snapshot as Invalid" step 440. All regions that are invalid in the space-saving snapshot are read from the parent copy of the data. This marking can be performed by marking module(s), means, and/or instructions.

Figure 5A:
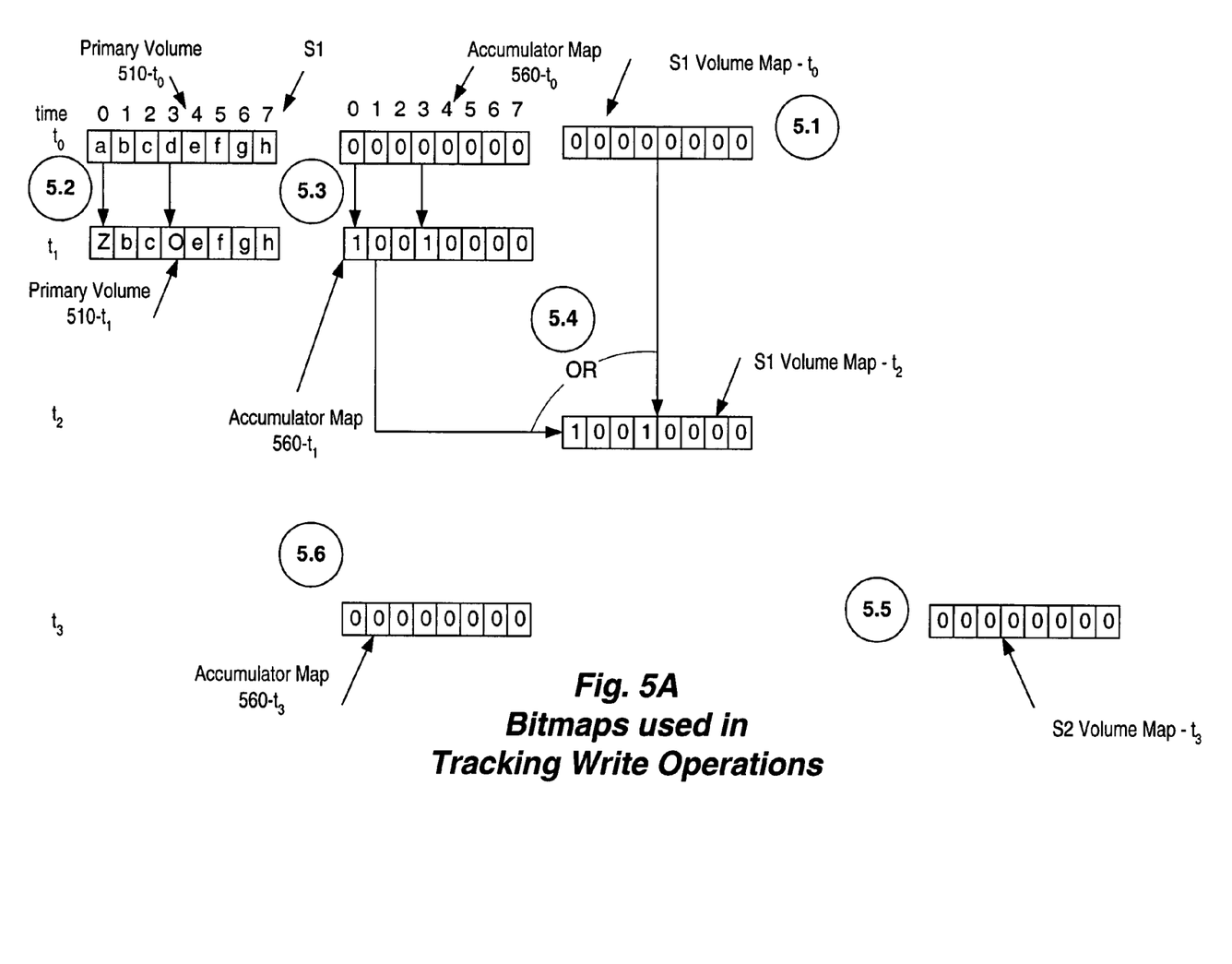
FIGS. 5A and 5B illustrate tracking write operations using a set of bitmaps in accordance with one embodiment of the invention.
Figure 5B:
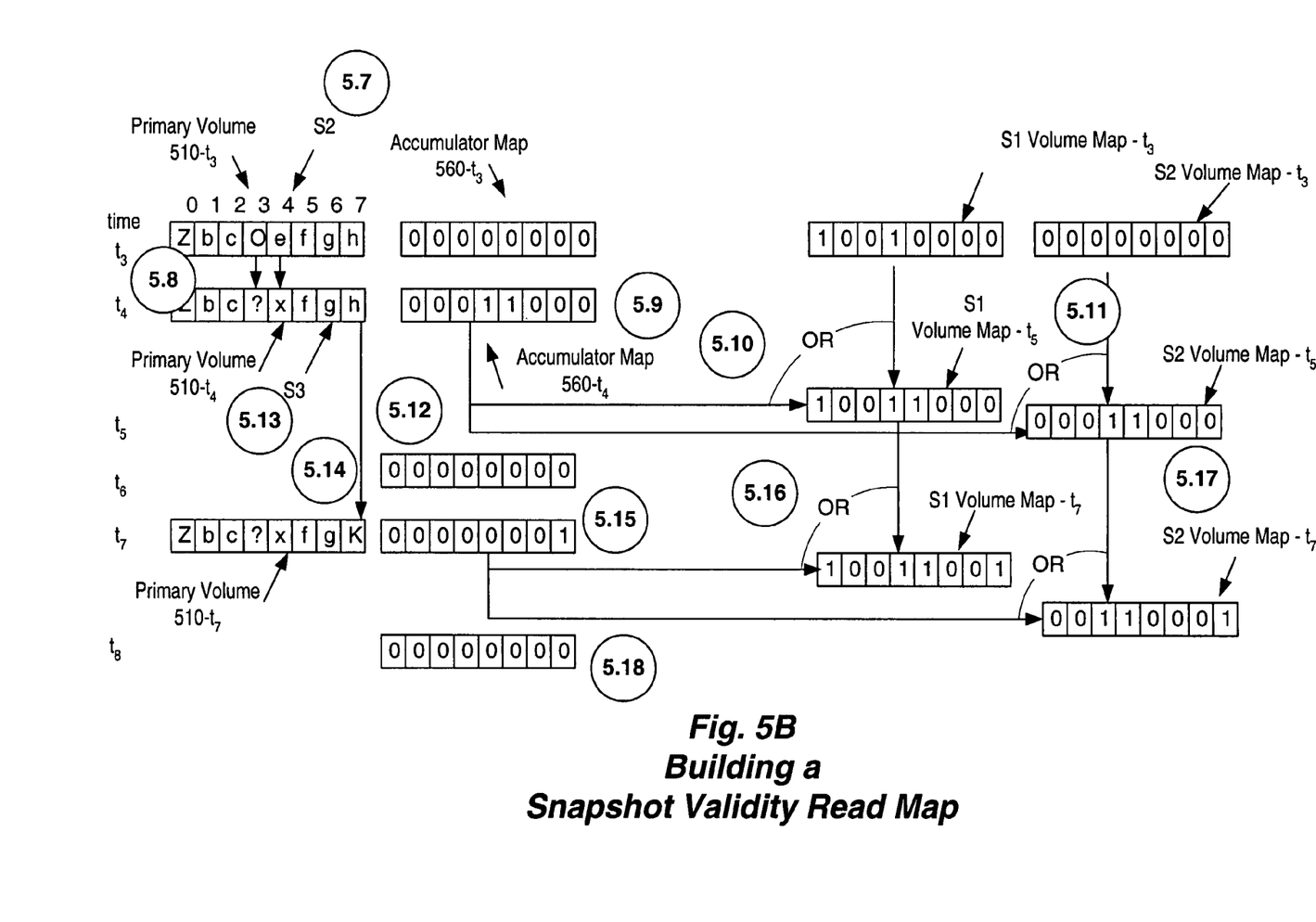

FIGS. 5A and 5B illustrate tracking write operations using a set of bitmaps in accordance with one embodiment of the invention. As described with reference to FIG. 4, once the differences between a full-data snapshot and its parent data are identified, those regions can be copied to a space-saving snapshot. Creating a space-saving snapshot frees space that is not needed while preserving the contents of the full-data snapshot.

FIG. 5A shows a primary volume 510 at time to, labeled as Primary Volume 510-$t_0$. The contents of a snapshot S1 made at time to has the same contents as Primary Volume 510-$t_0$. FIG. 5A bitmaps include accumulator map 560, a snapshot volume map for snapshot S1, and a snapshot volume map for another snapshot S2 to be created later. Accumulator map 560 is created to track changes to the primary volume 510 after time $t_0$. A "volume map" is created to track changes to the primary volume 510 after the corresponding snapshot is made. In action 5.1, S1 Volume Map-$t_0$ is created to track write operations made to the primary volume 510 after the corresponding snapshot S1 was made. The S1 volume map is initialized to have values of zeros, as shown by S1 Volume Map-$t_0$. For a space-saving snapshot (not shown), no further action is needed to make snapshot S1. For a full-data snapshot (not shown), sufficient storage space is allocated to store all regions of primary volume 110.

Starting with initial values of zero at time $t_0$ in S1 volume map-$t_0$, assume that write operations to regions 0 and 3 of primary volume 510 occur in action 5.2, replacing the value of 'a' with 'Z' in region 0 and replacing the value of 'd' with 'O' in region 3. In action 5.3, corresponding bits for the changed regions 0 and 3 in accumulator map 560 are set to '1,' as shown by accumulator map 560-$t_1$. Assume that a snapshot S2 is to be taken of primary volume 510 at this point. The contents of primary volume 510-$t_1$ will be captured as snapshot S2.

Prior to taking snapshot S2, in action 5.4 at time $t_2$, all active volume maps (here S1 Volume Map-$t_0$) are updated with the current contents of the accumulator map 560. In this example, an OR operation is performed between the current contents of accumulator map 560 (the contents of which have not changed between $t_1$ and $t_2$) and the contents of S1 Volume Map-$t_0$, which contains all zeroes, to produce S1 Volume Map-$t_2$. Note that S1 Volume Map-$t_2$ captures all regions changed in primary volume 510 after snapshot S1 was created at time to.

At time $t_3$, a new 'volume map' is established for snapshot S2 and initialized to contain all zeroes, as shown by S2 Volume Map-$t_3$ in action 5.5. S2 Volume Map will be used to track changes to primary volume 510 after snapshot S2 is created. In action 5.6, accumulator map 560-$t_3$ is reset to contain values of zero. Tracking of write operations to primary volume 510 begins anew at time $t_3$. All previous write operations after time to are captured in the S1 Volume Map.

Continuing to FIG. 5B, in action 5.7, snapshot S2 is pointed out to show that S2 will capture the image of the primary volume as it appeared at time $t_3$. In action 5.8, regions 3 and 4 are overwritten, changing the value of region 3 from 'O' to '?' and the value of region 4 from 'e' to 'x.' In action 5.9, regions 3 and 4 are updated in accumulator map 560-$t_4$. In preparation for taking yet another snapshot, in actions 5.10 and 5.11, the S1 and S2 volume maps are updated by an OR operation performed with the accumulator map, respectively producing S1 Volume Map-$t_5$ and S2 Volume Map-$t_5$. The volume map for S1 now shows that the primary volume 510 has changed data in regions 0, 3, and 4 since snapshot S1 was created at time $t_0$. The volume map for S2 shows that the primary volume 510 has changed data in regions 3 and 4 since snapshot S2 was created at time $t_3$. In action 5.12 at time $t_6$, the accumulator map is again set to all zeros. Action 5.13 shows the image of primary data that will be captured as snapshot S3. An S3 Volume Map-t6 (not shown) is initialized to all zeroes.

At time $t_7$, the value of region 7 of primary volume 510-$t_7$ is updated, as shown in action 5.14. The accumulator map 560 is updated in action 5.15. A snapshot S4 taken at time $t_7$ would contain the same data as primary volume 510-$t_7$. In preparation for the next snapshot, volume maps for all active snapshots S1, S2, and S3 (not shown) are updated in actions 5.16 and 5.17, respectively producing S1 Volume Map-$t_7$, S3 Volume Map-$t_7$, and S3 Volume Map-$t_7$ (not shown). The volume map for S1 now shows that the primary volume 510 has changed data in regions 0, 3, 4, and 7 since snapshot S1 was created at time $t_1$. The volume map for S2 shows that the primary volume 510 has changed data in regions 3, 4, and 7 since snapshot S2 was created at time $t_4$. The volume map for S3 would show that data have changed in region 7 since S3 was created. At time $t_8$ in action 5.18, accumulator map 560 is again set to all zeroes.

Figure 5C:
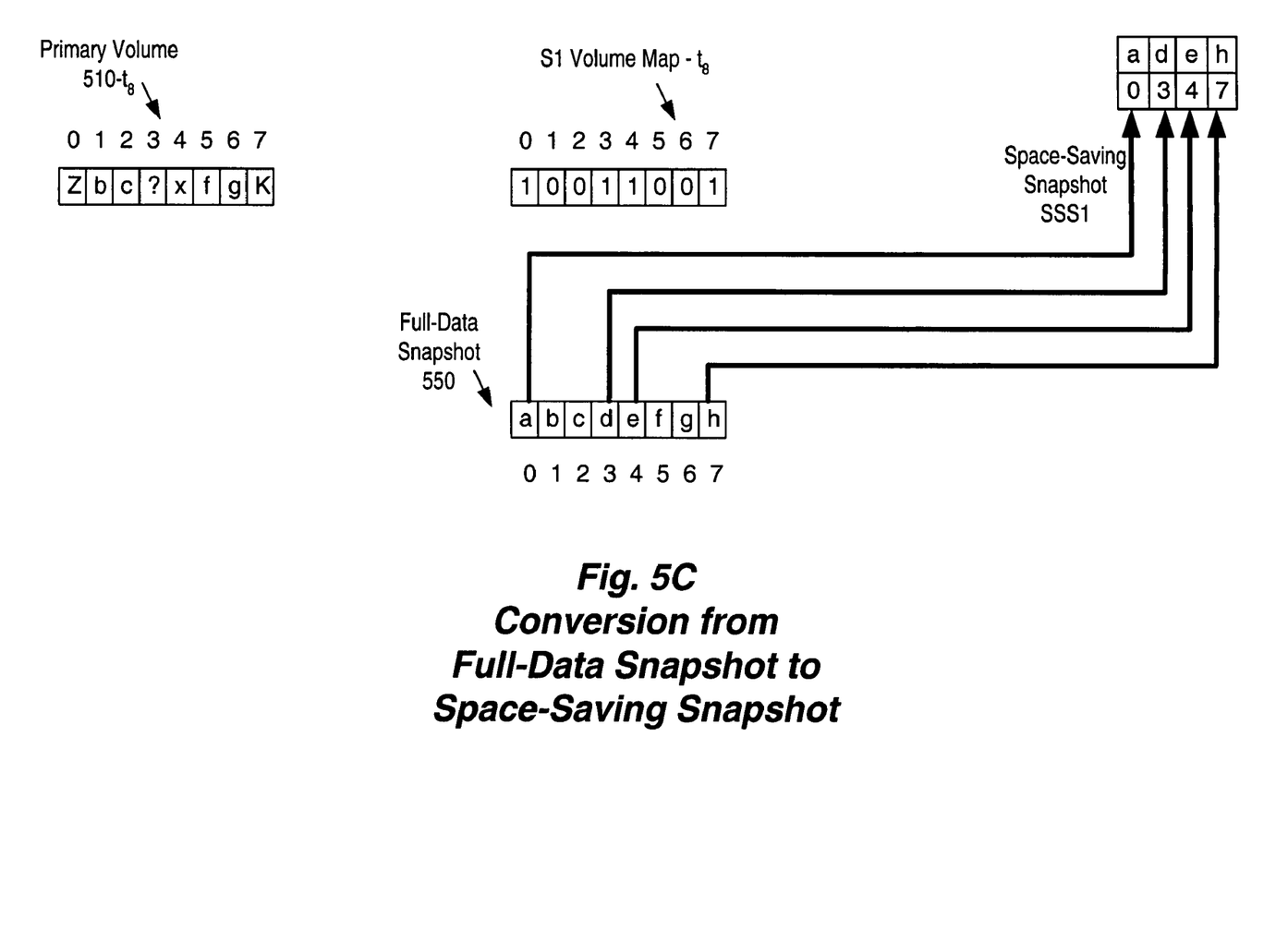
FIG. 5C shows a space-saving snapshot created from an instant full-data snapshot.

FIG. 5C shows a space-saving snapshot created from an instant full-data snapshot. The full-data snapshot of interest is a full-data snapshot of primary volume 110 as it appeared at time $t_8$ in FIG. 5B, shown here as primary volume 510-$t_8$. The OR operations performed with respect to operations 5.4 of FIGS. 5A and 5.10, 5.11, 5.16, and 5.17 of FIG. 5B identify the differences between each snapshot S1 and S2 and its parent (respectively, the primary volume 510 at times $t_0$ and $t_4$). A bit value of '1' in each snapshot's respective volume map indicates that the corresponding region should be preserved in the equivalent snapshot. In the example of FIG. 5C, a space-saving snapshot appears as SSS1, with respective values for regions 0, 3, 4, and 7. Note that storage space for only four regions is needed because the data for the remaining four regions are unchanged in primary volume 510.

When an instant snapshot is created, the snapshot does not contain any valid data. For an instant full-data snapshot, data are copied from the primary volume in the background. Therefore, the data for a given region in the snapshot could be in one of the following three states:

INVALID—This state indicates that the region has not been synchronized with the original volume. When an instant snapshot is created, all regions are initialized as INVALID. At least one region in the INVALID state indicates that the volume is still dependent on the original parent volume for that region's data.

CURRENT—This state indicates that the region has been copied from the original volume. A region moves from the INVALID state to the CURRENT state when one of the following conditions occurs:
(a) The region has been copied from the primary volume, or
(b) A write operation occurred on the original volume that required the original data for the region be preserved in the snapshot. Such write operations are referred to as "pushed" write operations.

MODIFIED—This state indicates that the region has been modified due to a write operation on the volume. Both primary volumes and snapshot volumes can be modified.

As illustrated in FIGS. 5A through 5C, the accumulator map represents each region with a single bit. The bit indicates the state of the region to which it belongs, with 0 indicating that the region is unchanged (or CURRENT by the above definition) and 1 indicating that it is modified (MODIFIED). These states can be represented by a table, which is described below with reference to FIG. 6.

Figure 6:
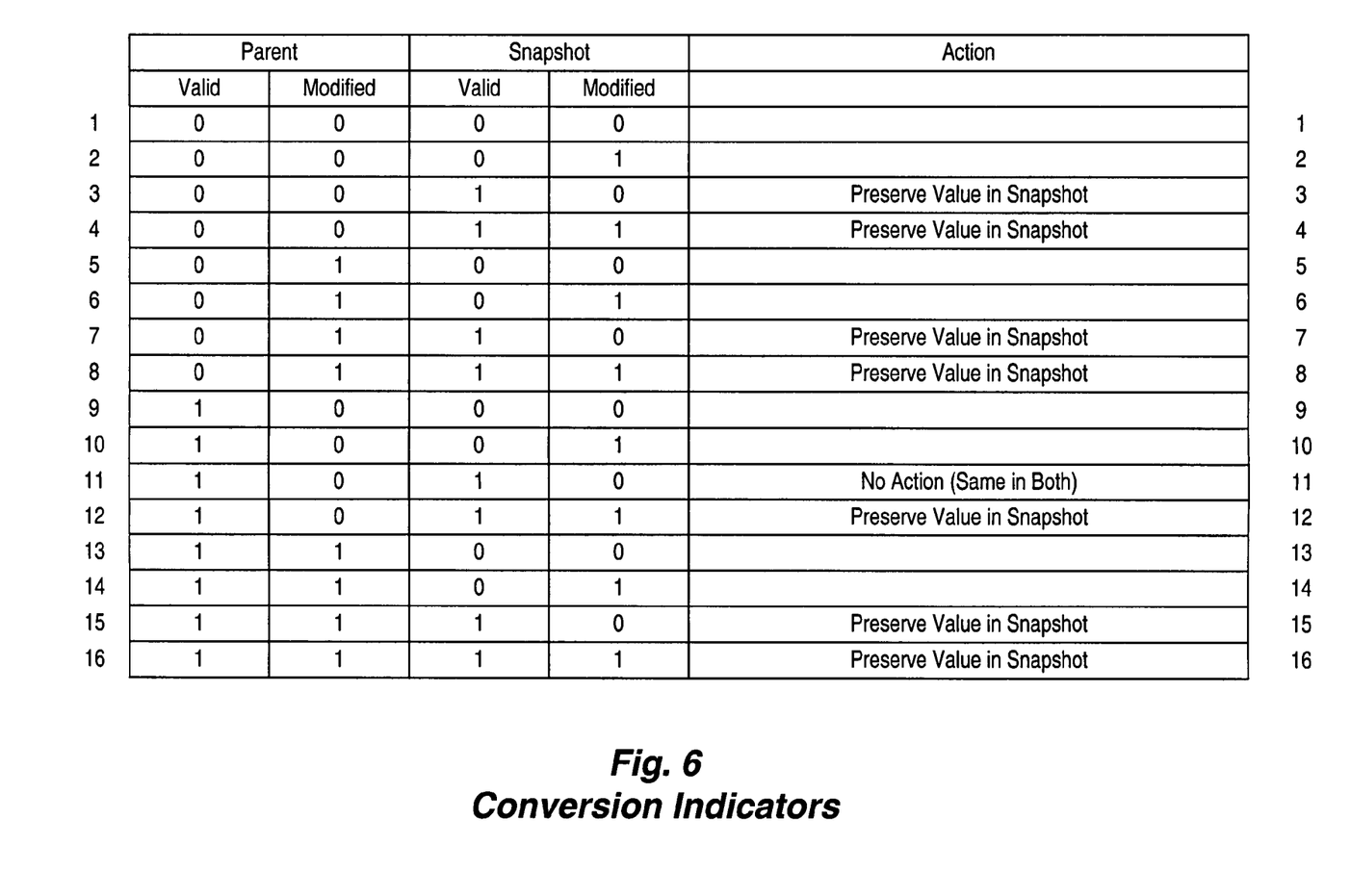
FIG. 6 shows bitmap values that can be used in converting from a full-data snapshot to a space-saving snapshot, or vice versa, in accordance with one embodiment of the invention.

FIG. 6 shows bitmap values that can be used in converting from a full-data snapshot to a space-saving snapshot, or vice versa, in accordance with one embodiment of the invention. In performing the conversion between full-data and space-saving snapshots, data in the original snapshot should be preserved as the data appears at the time of conversion. Respective read operations performed on the full-data snapshot and the space-saving snapshot should produce the same result. In the first eight rows of the table of FIG. 6, the parent's data are INVALID and the data from the snapshot should be preserved if VALID. Therefore, a region having bitmap values corresponding to rows 3, 4, 7, and 8 should be identified for copying from one snapshot to the other. In rows 9, 10, 13, and 14, the snapshot's data is INVALID; if the parent has VALID data (as is the case for all four rows 9, 10, 13, and 14), the data can be read from the parent and there is no need to preserve the value in the snapshot.

In rows 9 through 12, the parent's data is VALID and UNMODIFIED; therefore only data that is both VALID and MODIFIED in the snapshot should be preserved, as shown in row 12. In row 11, both the snapshot and the parent are shown as VALID and UNMODIFIED; no action need be taken to preserve the snapshot's value because the parent's value has not changed since the snapshot was created. In rows 13-16, the parent's data is both VALID and MODIFIED. For rows 13 and 14, data should be read from the parent since the snapshot's data are INVALID. For rows 15 and 16, data should be copied from the snapshot because the parent's data values have been MODIFIED since the snapshot was created.

The bitmaps described with reference to FIG. 6 can be represented in a data change object. To convert from a space-saving snapshot to a full-data snapshot, regions that are valid in the space-saving snapshot can be copied to an instant full-data snapshot. The data change object of the space-saving snapshot can then be used as the data change object for the new full-data instant snapshot.

In one embodiment, a "hierarchy" of snapshots can be created. An initial snapshot of a primary volume can be created, and then another snapshot can be taken of the initial snapshot. This technique is especially useful with writeable snapshots, where the MODIFIED status of a given region can be affected by a write operation to the snapshot that has no corresponding write operation to the primary data. When converting from a full-data snapshot to a space-saving snapshot, or vice versa, the "parent/child" hierarchy between snapshots should be preserved.

The present invention provides many advantages. A copy of data can be converted from a full-data snapshot to a space-saving snapshot, or vice versa, while retaining all the contents of the data. Performance objectives can be met by using full-data snapshots, possibly enabling service level agreements to be met. Space-conserving objectives can be met by using space-saving snapshots, enabling an organization to maintain many point-in-time copies of its production data for recovery purposes. In fact, if the efficiency of read operations is of less importance than the cost of storage space, an organization might choose to store all of its backup data in space-saving snapshots and convert to full-data snapshots only on an as-needed basis.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The embodiments described herein are shown as operating in a clustered environment. However, the scope of the invention is not limited to a clustered environment, and other types of distributed computing environments may also use the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    converting between a full-data snapshot and a space-saving snapshot, wherein
        the full-data snapshot comprises memory to store data for each region of a plurality of regions of primary data, and
        the space-saving snapshot comprises memory to store data for each changed region of the plurality of regions of the primary data, wherein
            memory to store data for a first region of the plurality of regions is allocated to the space-saving snapshot in response to a change to the primary data in the first region, and
            no memory is allocated to the space-saving snapshot for a second region of the plurality of regions if no change to the primary data in the second region occurs.

2. The method of claim 1 wherein
    converting from the full-data snapshot to the space-saving snapshot comprises:
    identifying a first set of regions of the plurality of regions, wherein
        each region in the first set has primary data that have changed since a point in time;
    allocating memory in the space-saving snapshot for each region in the first set of regions; and
    copying an original value for the primary data of each region in the first set of regions from the full-data snapshot to the space-saving snapshot.

3. The method of claim 2 further comprising:
    identifying a second set of regions of the primary data, wherein
        each region in the second set has primary data that have not changed since the point in time; and
    freeing memory previously allocated for the second set of regions in the full-data snapshot.

4. The method of claim 2 further comprising:
    marking each region in the space-saving snapshot as valid in the full-data snapshot; and
    after each region in the space-saving snapshot is marked in the full-data snapshot,
        marking each unmarked region in the full-data snapshot as invalid in the full-data snapshot.

5. The method of claim 1 wherein converting from the space-saving snapshot to the full-data snapshot comprises:
    allocating memory to store the primary data to the full-data snapshot;
    saving valid data from the space-saving snapshot in the full-data snapshot; and
    copying data for regions with no data in the space-saving snapshot from a parent of the space-saving snapshot to the full-data snapshot.

6. The method of claim 5 further comprising:
constructing the full-data snapshot as an instant full-data snapshot by performing the following:
after the valid data are saved in the full-data snapshot, making the full-data snapshot available; and
performing the copying of the data for the regions with no data from the parent into the full-data snapshot while the full-data snapshot is available.

7. The method of claim 5 wherein
the parent of the space-saving snapshot comprises the primary data.

8. The method of claim 5 further comprising:
marking each region in the full-data snapshot as valid.

9. A computer-readable storage medium comprising:
converting instructions, executable by a processor, and configured to convert between a full-data snapshot and a space-saving snapshot, wherein
the full-data snapshot comprises memory to store data for each region of a plurality of regions of primary data, and
the space-saving snapshot comprises memory to store data for each changed region of the plurality of regions of the primary data, wherein
memory to store data for a first region of the plurality of regions is allocated to the space-saving snapshot in response to a change to the primary data in the first region, and
no memory is allocated to the space-saving snapshot for a second region of the plurality of regions if no change to the primary data in the second region occurs.

10. The computer-readable storage medium of claim 9 further comprising:
first converting instructions, executable by the processor, and configured to convert from the full-data snapshot to the space-saving snapshot, wherein the first instructions comprise:
identifying instructions, executable by the processor, and configured to identify a first set of regions of the plurality of regions, wherein
each region in the first set has primary data that have changed since a point in time;
allocating instructions, executable by the processor, and configured to allocate memory in the space-saving snapshot for each region in the first set of regions; and
copying instructions, executable by the processor, and configured to copy an original value for the primary data of each region in the first set of regions from the full-data snapshot to the space-saving snapshot.

11. The computer-readable storage medium of claim 10 further comprising:
second identifying instructions, executable by the processor, and configured to identify a second set of regions of the primary data, wherein
each region in the second set has primary data that have not changed since the point in time; and
freeing instructions, executable by the processor, and configured to free memory previously allocated for the second set of regions in the full-data snapshot.

12. The computer-readable storage medium of claim 9 further comprising:
first marking instructions, executable by the processor, and configured to mark each region in the space-saving snapshot as valid in the full-data snapshot; and
second marking instructions, executable by the processor, and configured to perform the following:
after each region in the space-saving snapshot is marked in the full-data snapshot, mark each unmarked region in the full-data snapshot as invalid in the full-data snapshot.

13. The computer-readable storage medium of claim 9 further comprising:
second converting instructions, executable by the processor, and configured to convert from the space-saving snapshot to the full-data snapshot, wherein the second instructions comprise:
allocating instructions, executable by the processor, and configured to allocate memory to store the primary data to the full-data snapshot;
saving instructions, executable by the processor, and configured to save valid data from the space-saving snapshot in the full-data snapshot; and
copying instructions, executable by the processor, and configured to copy data for regions with no data in the space-saving snapshot from a parent of the space-saving snapshot to the full-data snapshot.

14. The computer-readable storage medium of claim 13 further comprising:
constructing instructions, executable by the processor, and configured to construct the full-data snapshot as an instant full-data snapshot by performing the following:
after the valid data are saved in the full-data snapshot, making the full-data snapshot available; and
performing the copying of the data for the regions with no data from the parent into the full-data snapshot while the full-data snapshot is available.

15. The computer-readable storage medium of claim 13 wherein the parent of the space-saving snapshot comprises the primary data.

16. The computer-readable storage medium of claim 13 further comprising:
marking instructions, executable by the processor, and configured to mark each region in the full-data snapshot as valid.

17. A system comprising:
first converting means for converting between a full-data snapshot and a space-saving snapshot, wherein
the full-data snapshot comprises memory to store data for each region of a plurality of regions of primary data, and
the space-saving snapshot comprises memory to store data for each changed region of the plurality of regions of the primary data, wherein
memory to store data for a first region of the plurality of regions is allocated to the space-saving snapshot in response to a change to the primary data in the first region, and
no memory is allocated to the space-saving snapshot for a second region of the plurality of regions if no change to the primary data in the second region occurs; and
second converting means for converting from the full-data snapshot to the space-saving snapshot.

18. The system of claim 17, wherein the second converting means comprise:
identifying instructions to identify a first set of regions of the plurality of regions, wherein
each region in the first set has primary data that have changed since a point in time;
allocating instructions to allocate memory in the space-saving snapshot for each region in the first set of regions; and copying instructions to copy an original value for the primary data of each region in the first set of regions from the full-data snapshot to the space-saving snapshot.

19. The system of claim 17 further comprising:
third converting means for converting from the space-saving snapshot to the full-data snapshot.

20. The system of claim 19, wherein the third converting means comprise:
allocating means for allocating memory to store the primary data to the full-data snapshot;
saving means for saving valid data from the space-saving snapshot in the full-data snapshot; and
copying means for copying data for regions with no data in the space-saving snapshot from a parent of the space-saving snapshot to the full-data snapshot.

21. A system comprising:
a converting module to convert between a full-data snapshot and a space-saving snapshot, wherein
the full-data snapshot comprises memory to store data for each region of a plurality of regions of primary data, and
the space-saving snapshot comprises memory to store data for each changed region of the plurality of regions of the primary data, wherein
memory to store data for a first region of the plurality of regions is allocated to the space-saving snapshot in response to a change to the primary data in the first region, and
no memory is allocated to the space-saving snapshot for a second region of the plurality of regions if no change to the primary data in the second region occurs.

22. The system of claim 21 further comprising:
a second converting module to convert from the full-data snapshot to the space-saving snapshot, wherein the second converting module comprises:
identifying instructions to identify a first set of regions of the plurality of regions, wherein
each region in the first set has primary data that have changed since a point in time;
allocating instructions to allocate memory in the space-saving snapshot for each region in the first set of regions; and
copying instructions to copy an original value for the primary data of each region in the first set of regions from the full-data snapshot to the space-saving snapshot.

23. The system of claim 21 further comprising:
a second converting module to convert from the space-saving snapshot to the full-data snapshot, wherein the second converting module comprises:
allocating instructions to allocate memory to store the primary data to the full-data snapshot;
saving instructions to save valid data from the space-saving snapshot in the full-data snapshot; and
copying instructions to copy data for regions with no data in the space-saving snapshot from a parent of the space-saving snapshot to the full-data snapshot.

* * * * *